3,060,159
PURIFICATION OF UNREACTED MONOMERS
Kenneth R. Lea and Thomas M. Veazey, Decatur, Ala., assignors, by mesne assignments, to Monsanto Chemical Company, a corporation of Delaware
No Drawing. Filed May 10, 1960, Ser. No. 27,993
10 Claims. (Cl. 260—85.5)

This invention relates to a new and improved method of recovering unreacted monomers from the aqueous effluent of a polymerization reaction of monomer mixtures, containing a vinyl ester, in a substantially pure state being free of sulfur dioxide, low in acetaldehyde content and requiring no further purification prior to reuse in a subsequent polymerization reaction More particularly this invention relates to purifying an unreacted monomer of the copolymerization reaction of acrylonitrile and a vinyl ester in the presence of a redox catalyst system of a persulfate, a source which generates sulfur dioxide, after the unreacted monomer has been withdrawn from the polymerization reactor, the mixture of polymer and monomer having been shortstopped and filtered, thus leaving the unreacted monomers in solution along with sulfur dioxide and other impurities.

It is of importance to remove the sulfur dioxide prior to passing the unreacted monomer solution into the monomer recovery column system as the sulfur dioxide, if carried into the recovery system will cause polymerization in the system thus resulting in plugging which necessitates the shutting down of the recovery system in order to clean same. This results in lost time and is economically undesirable.

In the past the sulfur dioxide control was achieved by addition of sodium bicarbonate but this created a second impurity problem, that of acetaldehyde. With the addition of the bicarbonate, the pH of the unreacted monomer solution rose to above about 5 which greatly accelerated hydrolysis of the vinyl ester present as part of the unreacted monomers which resulted in additional quantities of acetaldehyde being produced and being present in the recovered monomer, thus hindering the subsequent polymerization reaction using some of the recovered monomer. It appears that an aldehyde-bisulfite complex is formed at the expense of the sulfur dioxide activator of the redox catalyst system, thus causing an increase in the specific viscosity of the subsequently produced polymer from the preferred .26 to about .4 as determined from a .1 percent solution of the polymer in dimethylformamide. Another method to obtain a substantially pure recovered monomer used in the prior art is to decant the distillate of the monomer recovery column, but this resulted in a loss of monomer in the phase which is discarded.

Previously it was thought the acetaldehyde content of the unreacted recovered monomers could be controlled by treating the recovered monomers with activated charcoal; however, after treating the recovered monomers with activated charcoal and using same in a new polymerization stream, 70 percent fresh plant monomer to 30 percent recovered monomers, it was found that the specific viscosity was not lowered to the acceptable viscosity of about .26, but it actually resulted in an increase in the specific viscosity to .477. Then the most apparent method for removing acetaldehyde from the recovered monomers, that of distillation was tried. In the fractionation, essentially all of the acetaldehyde was concentrated in the first fraction, with only traces of acetaldehyde in the mid-cut and tails fractions. An alternative method was to discard the reflux stream of the monomer recovery system. It was determined that in the decanter approximately half of the acetaldehyde was in the monomer phase and half in the water phase. As the water phase was normally fed back to the column as reflux, the acetaldehyde was merely being recycled. The water phase was totally discarded which resulted in a considerable reduction in the acetaldehyde concentration. The entire reflux was discarded and the acetaldehyde content of the recovered monomer was reduced to an acceptable limit.

All of the above methods for removing acetaldehyde from the recovered monomer were very costly in that a certain amount of monomers was discarded in order to remove or lower the acetaldehyde and nothing was done to remove the sulfur dioxide content. Thus the problem of controlling the acetaldehyde content and removal of the sulfur dioxide from the unreacted monomers still remained.

An object of this invention is to prevent premature polymerization of recovered monomer in the monomer recovery system.

Another object is to recover the monomers free of sulfur dioxide and low in aldehyde content.

Another object is to recover a monomer which will not need additional purification prior to reuse in subsequent polymerization.

Another object is to prevent hydrolysis of the vinyl esters present in the unrecovered monomers.

The objects of the present invention are generally accomplished by treating with hydrogen peroxide the aqueous monomer containing solution of a polymerization reaction in which a redox catalyst system was used, the activator of the redox system comprising a water soluble, oxidizable sulfoxy compound in which the valence of a sulfur atom does not exceed 4, followed by steam stripping of the solution in the normal manner to separate the monomers from the aqueous solution. The hydrogen peroxide quantitatively converts the sulfur dioxide to sulfuric acid thus effectively removing the sulfur dioxide from the unreacted monomer solution, and at the same time tending to lower the pH which prevents the hydrolysis of the vinyl esters into the carbonyl and acetaldehyde. The resulting pH is about 3.0–3.5. Thus, with the addition of the hydrogen peroxide, the sulfur dioxide is prevented from passing into the monomer recovery column, and at the same time a sufficiently low pH is maintained so that the acetaldehyde content of the recovered monomer is within controllable limits and maintained at a constant level. The acceptable level of acetaldehyde concentration in the monomer feed to a polymerization reactor should be held constant and below 0.01 percent by weight of the monomer in order to maintain a satisfactory specific viscosity.

In accordance with the present invention the addition of hydrogen peroxide is employed to purify the unreacted and unrecovered monomers of the polymerization reaction of those vinyl compounds, one of which is a vinyl carboxylate, which undergo addition polymerization to form high molecular weight linear polymers, by which is meant that a large number of monomer molecules add onto one another to form a large molecule having a predominately linear structure. These vinyl monomers which undergo such polymerization contain the characteristic structure $CH_2=C<$. Examples of this class of monomers include the aryl olefins such as styrene, the chlorostyrenes, p-methoxy styrene, alpha-methylstyrene, vinyl naphthalene and the like; acrylic acid and substituted acrylic acids and their esters, nitriles and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylamide, and the like; methyl isopropenyl ketone, methyl vinyl ketone, methyl vinyl ether, vinyl ethinyl carbinols, vinylidene chloride, vinyl pyridine, vinyl acetate, vinyl chloride, vinyl furane, vinyl carbazole, furmaric acid esters, dialkyl maleate, vinyl acetylene and esters, alcohols, acids, ethers and the like of the type described.

The hydrogen peroxide purification agent of this invention is of excellent value in the recovery of substantially pure unreacted monomers when polymerizing a vinyl monomeric material comprising acrylonitrile with one or more other compounds containing the characteristic $CH_2=C<$ group which are copolymerizable therewith, such as, for example, the aryl olefins, particularly styrene, acrylic acid and substituted acrylic acids, esters, and amides, methylisopropenyl ketone, vinyl chloride, vinylidene chloride, vinyl acetate and similar compounds, one of the copolymerizable monomers being a vinyl ester such as vinyl acetate, vinyl butyrate, vinyl valerate, vinyl pelargonate, vinyl stearate and vinyl laurate. Copolymerization of acrylonitrile and any of the above monomers find particular application in the field of synthetic fibers when composed of at least about 80 percent by weight of acrylinitrile and up to about 20 percent by weight of one or more of the above listed vinyl monomers.

The hydrogen peroxide purifying agent has been found to be effective in the recovery of a substantially pure unreacted monomer of the addition polymerization reaction occurring when the vinyl polymerization materials are subjected to any of the well known methods of polymerization which are catalyzed by the redox catalyst system; those in which a catalyst-activator system is employed containing both an oxidizing and a reducing agent in which the activator is a water soluble oxidizable sulfoxy compound in which the valence of a sulfur atom does not exceed 4. Thus, the polymeriaztion of the above defined monomeric materials can be carried out in a heterogeneous system such as an aqueous emulsion or dispersion wherein the monomeric material is dispersed in a suitable liquid such as water, optionally with the aid of a suitable emulsifying agent, and polymerization is effected by adding the redox polymerization catalyst and activator and agitating until the polymer is formed. The purifying agent of the present invention is of particular value in the recovery of a substantially pure unreacted monomer of the polymerization reaction where the polymerization is conducted in a homogeneous system as by heating the monomeric material in a suitable solvent in the presence of redox polymerization catalyst-activator systems.

The hydrogen peroxide purifying agent of the present invention is applicable to the recovery of a substantially pure unreacted monomers of a batch polymerization process or a continuous polymerization process. This purifying agent is added to the aqueous solution of unreacted monomers and impurities after the polymerization has been shortstopped and filtered. Also this agent is applicable to the recovery of a substantially pure unreacted monomer of a polymerization reaction carried out in the presence of a redox catalyst system which employs as a catalyst an oxygen-liberating compound of the type generally recognized as effective in vinyl polymerizations and as an activator a water soluble, oxidizable sulfoxy compound in which the valence of a sulfur atom does not exceed 4. In such redox systems the catalyst may comprise perborates, perchlorate, persulfates, persulfuric acid and perdisulfates. Likewise the activator may comprise inorganic oxidizable sulfoxy compounds, such as sulfur dioxide, sodium bisulfite, metabisulfite, sodium hydrosulfite and sodium thiosulfate or organic oxidizable sulfur compounds such as dialkyl sulfites, p-toluene sulfinic acids and formamidine sulfinic acids.

The method of carrying out the present invention consists in adding hydrogen peroxide to the filtrate of a polymerization reaction, after the reaction has been shortstopped and filtered but prior to passing the filtrate into the monomer recovery column so that the unreacted monomer will be in contact with the hydrogen peroxide for at least 60 seconds before entry into the stripping recovery column. A convenient point for the hydrogen peroxide addition is into the filtrate line just ahead of the stripping recovery column feed tank.

The minimum amount of hydrogen peroxide added to react with all the sulfur dioxide to produce sulfuric acid and also maintain the pH sufficiently low, not above 4, so that is no hydrolysis of the vinyl ester which would increase the acetaldehyde content, is 1.2 equivalents of the sulfur dioxide present in the filtrate. The sulfur dioxide source which was added to the polymerization reaction initially is carried on through the shortstopping and filtering, leaving same in the feed line to the stripping monomer recovery column. The sources are as described hereinbefore, any water soluble, oxidizable sulfoxy compound in which the valence of a sulfur atom does not exceed 4, such as sulfur dioxide itself, sodium bisulfite, methabisulfite, sodium hydrosulfite, sodium thiosulfiate, dialkyl sulfites, p-toluene sulfinic acids and formamidine sulfinic acids. With the exception of sulfur dioxide itself, these compounds break down to sulfur dioxide when in an aqueous solution, e.g. in some instances the $SO_3$ ion is produced which combines with water to produce sulfurous acid which breaks down into sulfur dioxide and water. While an excess of hydrogen peroxide over that necessary to react with the sulfur dioxide is added, it is obvious that larger amounts may be used, but there is no advantage in a large excess, and it only adds to the final cost of the polymer. The excess was added as there is present in the unreacted monomers trace quantities of certain color bodies, and these are completely decolorized by this excess of hydrogen peroxide, leaving the recovered monomers water white. It was determined that there was no adverse effect on the recovered monomers if the contact time was extended. Also, the hydrogen peroxide treatment had no detrimental effect on the final polymer produced by using some of the recovered monomer. In fact, there was some indication of improvement in original brightness and in bleached color.

In order that those skilled in the art may better understand how the present invention can be carried into effect, the following examples are given by way of illustration and not by way of limitation. All parts and percentages are by weight unless otherwise stated.

*Example I*

An aqueous solution resulting from a shortstopped and filtered copolymerization reaction of 91 percent acrylonitrile and 9 percent vinyl acetate, was analyzed and it was determined that the solution contained .0750 percent of sulfur dioxide. To this solution was added a .15 equivalent of hydrogen peroxide, based upon the amount of sulfur dioxide present in the solution. The pH was maintained at 3–3.5. The hydrogen peroxide was added to the solution at a point prior to the monomer recovery column so that the sulfur dioxide was in contact with hydrogen peroxide at least 60 seconds prior to entry into the recovery column. At a point immediately before entry to the recovery column, the solution was analyzed to determine the amount of sulfur dioxide present after the 60 second contact time with hydrogen peroxide. The amount of sulfur dioxide present was .0640 percent representing a reduction of 14.7 percent of sulfur dioxide present in the untreated solution.

*Example II*

The same original solution as in Example I was treated with .30 equivalent of hydrogen peroxide, based upon the amount of sulfur dioxide present in the solution. The pH was maintained at 3–3.5. The hydrogen peroxide was added to the solution at a point prior to the monomer recovery column so that the sulfur dioxide was in contact with hydrogen peroxide at least 60 seconds prior to entry into the recovery column. At a point immediately before entry to the recovery column, the solution was analyzed to determine the amount of sulfur dioxide present after the 60 second contact time with hydrogen perioxide. The amount of sulfur dioxide present was .0525 percent representing a reduction of 30 percent of sulfur dioxide present in the untreated solution.

Example III

The same original solution as in Example I was treated with .45 equivalent of hydrogen peroxide, based upon the amount of sulfur dioxide present in the solution. The pH was maintained at 3–3.5. The hydrogen peroxide was added to the solution at a point prior to the monomer recovery column so that the sulfur dioxide was in contact with hydrogen peroxide at least 60 seconds prior to entry into the recovery column. At a point immediately before entry into the recovery column, the solution was analyzed to determine the amount of sulfur dioxide present after the 60 second contact time with hydrogen peroxide. The amount of sulfur dioxide present was .0377 percent representing a reduction of 49.7 percent of sulfur dioxide present in the untreated solution.

Example IV

The same original solution as in Example I was treated with .60 equivalent of hydrogen peroxide, based upon the amount of sulfur dioxide present in the solution. The pH was maintained at 3–3.5. The hydrogen peroxide was added to the solution at a point prior to the monomer recovery column so that the sulfur dioxide was in contact with hydrogen peroxide at least 60 seconds prior to entry into the recovery column. At a point immediately before entry to the recovery column, the solution was analyzed to determine the amount of sulfur dioxide present after the 60 second contact time with hyhydrogen peroxide. The amount of sulfur dioxide present was .0304 percent representing a reduction of 59.6 percent of sulfur dioxide present in the untreated solution.

Example V

The same original solution as in Example I was treated with equivalent of hydrogen peroxide, based upon the amount of sulfur dioxide present in the solution. The pH was maintained at 3–3.5. The hydrogen peroxide was added to the solution at a point prior to the monomer recovery column so that the sulfur dioxide was in contact with hydrogen peroxide at least 60 seconds prior to entry into the recovery column. At a point immediately before entry to the recovery column, the solution was analyzed to determine the amount of sulfur dioxide present after the 60 second contact time with hydrogen peroxide. No trace of sulfur dioxide was found and this represented a complete removal of sulfur dioxide which was present in the untreated solution.

We claim:

1. The method of controlling the carryover of sulfur dioxide in a monomer recovery system of a shortstopped copolymerization reaction of vinyl monomers selected from the group consisting of acrylonitrile, styrene, acrylic acid, substituted acrylic acid, methylisopropenyl ketone, vinyl chloride, vinylidene chloride, vinyl acetate, vinyl butyrate, vinyl valerate, vinyl pelargonate, vinyl stearate, vinyl laurate and other monomer-olefinic acrylonitrile copolymerizable monomers of a redox catalyst system in which the activator comprises a water soluble, oxidizable sulfoxy compound in which the valence of a sulfur atom does not exceed 4, comprising treating the filtrate of the shortstopped copolymerization reaction with hydrogen peroxide.

2. The method of claim 1 in which the vinyl comonomers are acrylonitrile and a vinyl carboxylate.

3. The method of claim 1 in which the vinyl monomers are acrylonitrile and vinyl acetate.

4. The method of claim 1 in which the vinyl monomers are at least 80 percent acrylonitrile and up to 20 percent of vinyl acetate.

5. The method of preventing the carryover of sulfur dioxide in a monomer recovery system of a shortstopped copolymerization reaction of vinyl monomers selected from the group consisting of acrylonitrile, styrene, acrylic acid, substituted acrylic acid, methylisopropenyl ketone, vinyl chloride, vinylidene chloride, vinyl acetate, vinyl butyrate, vinyl stearate, vinyl laurate and other monoolefinic acrylonitrile copolymerizable monomers of a redox catalyst system in which the activator comprises a water soluble, oxidizable sulfoxy compound in which the valence of a sulfur atom does not exceed 4, comprising maintaining the pH of the vinyl monomer solution at a pH 3–3.5, treating the unreacted monomer solution with 1 equivalent of hydrogen peroxide based upon the amount of sulfur dioxide present in the monomer solution, for at least 60 seconds prior to the beginning of the monomer recovery process of the unreacted vinyl monomer solution.

6. The method of claim 5 in which the vinyl monomers are acrylonitrile and a vinyl carboxylate.

7. The method of claim 5 in which the vinyl monomers are acrylonitrile and vinyl acetate.

8. The method of claim 5 in which the vinyl monomers are at least 80 percent acrylonitrile and up to 20 percent vinyl acetate.

9. The method of preventing the carryover of sulfur dioxide in a monomer recovery system of shortstopped copolymerization of at least 80 percent acrylonitrile and up to 20 percent of vinyl acetate of a redox catalyst system in which the activator comprises a water soluble, oxidizable, sulfoxy compound in which the valence of a sulfur atom does not exceed 4, comprising maintaining the pH of the solution at a pH of 3–3.5, treating the unreacted monomer solution with at least 1 equivalent of hydrogen peroxide, based upon the amount of sulfur dioxide present in the monomer solution, for at least 60 seconds prior to the starting of the monomer recovery process of the unreacted acrylonitrile and vinyl acetate monomer solution.

10. The method of claim 9 in which the vinyl monomers are 91 percent acrylonitrile and 9 percent vinyl acetate.

References Cited in the file of this patent

UNITED STATES PATENTS

| | | |
|---|---|---|
| 2,209,246 | Baner et al. | July 23, 1940 |
| 2,662,878 | Bryant | Dec. 15, 1953 |
| 2,770,603 | Lynch | Nov. 13, 1956 |

OTHER REFERENCES

Billmeyer: Textbook of Polzmer Chemistry, Interscience Pub., N.Y., 1957, pp. 254–5.